UNITED STATES PATENT OFFICE.

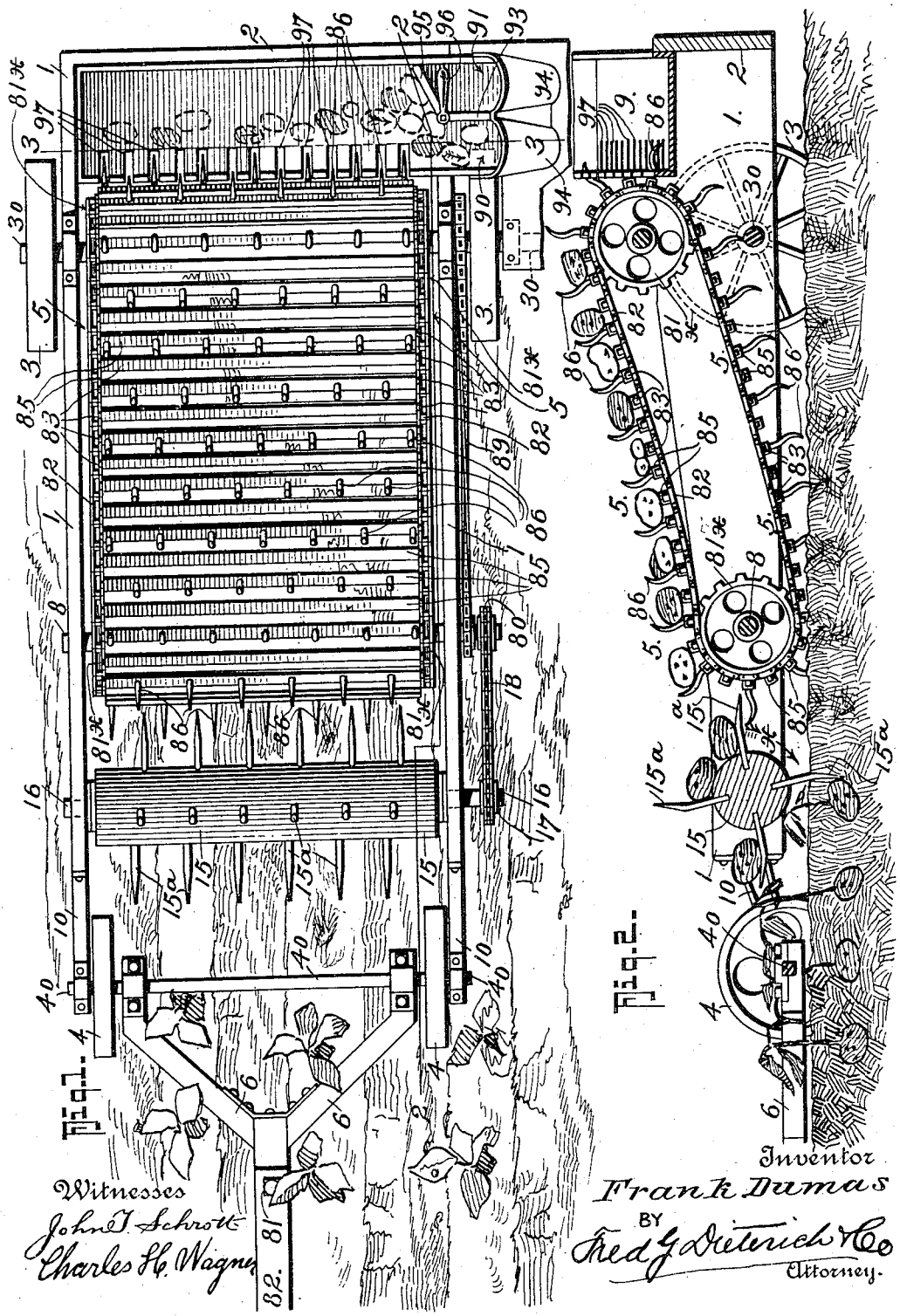

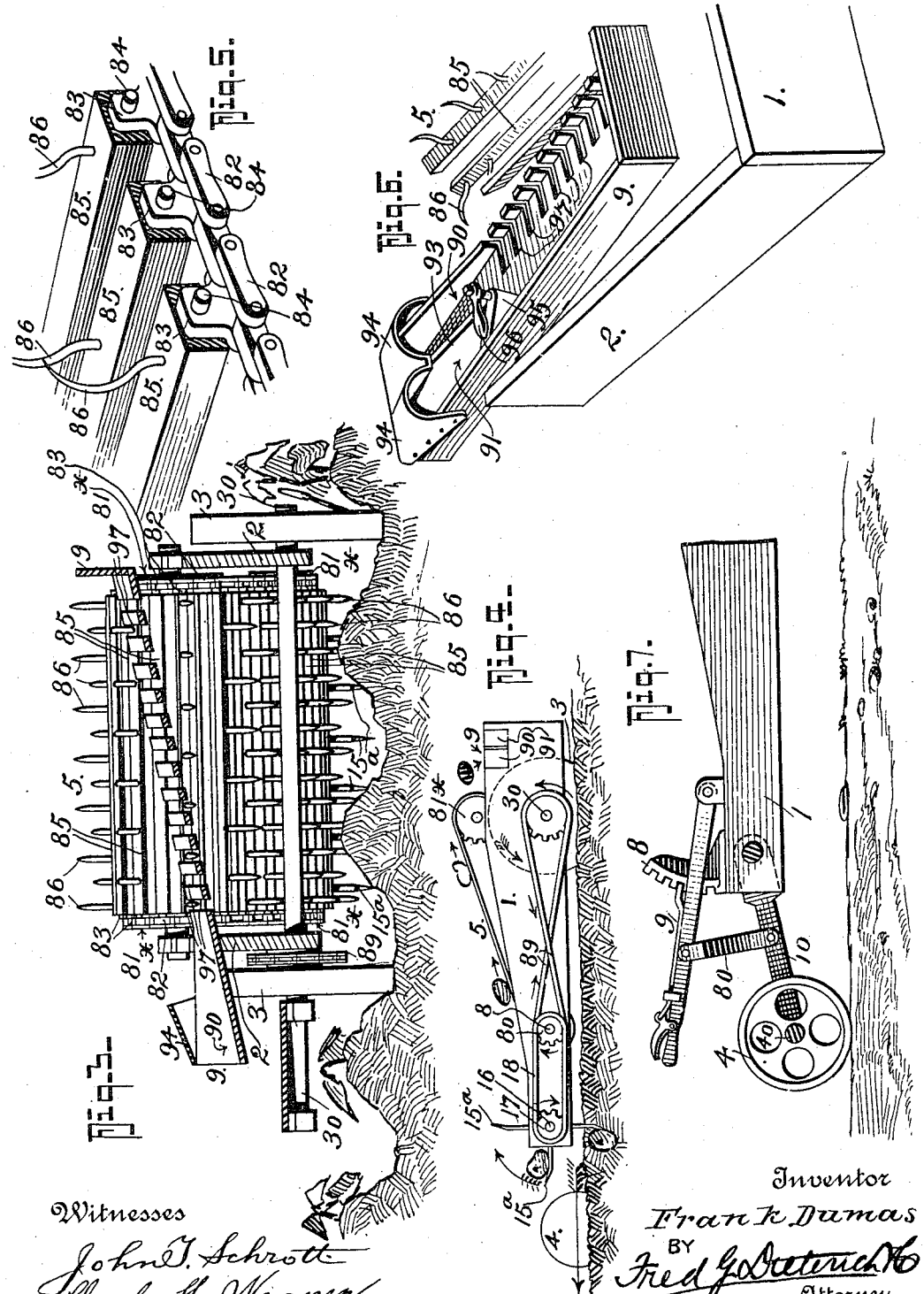

FRANK DUMAS, OF BURKE, NEW YORK.

POTATO-DIGGER.

981,985. Specification of Letters Patent. Patented Jan. 17, 1911.

Application filed September 6, 1910. Serial No. 580,554.

*To all whom it may concern:*

Be it known that I, FRANK DUMAS, residing at Burke, in the county of Franklin and State of New York, have invented a new and Improved Potato-Digger, of which the following is a specification.

This invention relates to that class of potato digging machines in which an endless picker belt is used for taking up the potatoes and depositing them into a conveyer or other offtake, and my said invention primarily has for its object to provide a simple and economically constructed digging machine of the type stated in which the several parts are compactly arranged and adapted for expeditiously picking up the potatoes and depositing them on the conveyer, without injury thereto.

With other objects in view that will hereinafter appear, my invention consists in certain details of construction and peculiar combination of parts, all of which will be hereinafter fully explained, specifically pointed out in the appended claims and illustrated in the accompanying drawings, in which:

Figure 1, is a plan view of my potato digger machine. Fig. 2, is a vertical longitudinal section thereof, on line 2—2 on Fig. 1. Fig. 3, is a cross section thereof taken on the line 3—3 on Fig. 1. Fig. 4, is a diagrammatic side view of my machine and showing more particularly the arrangement of the power transmitting belts. Fig. 5, is a detail view of a portion of the combined picker and conveyer chain. Fig. 6, is a detail perspective view of the valve controlled feed box that leads to the potato receiving sacks. Fig. 7, is a view that shows a modified form of the front end of the machine, hereinafter referred to.

In carrying out my invention in its simplest and preferred form, the framing consists of the side bars 1—1 and a rear cross board or beam 2, and the said frame is portably mounted on the rear wheels 3—3 fixedly held on the rear cross shaft 30 and the front wheels 4 on a shaft 40 mounted in the front ends of side timbers 10 that form extensions of the main sides 1—1 as clearly shown in Figs. 1 and 2, the said extensions being inclined downwardly to allow the front wheels to run deep in the furrows between the hills of potatoes.

Instead of rigidly connecting the side timbers 10 to the sides 1, as shown in Figs. 1 and 2 the said timbers 10 may be hingedly joined to the front end of the main frame, as shown in Fig. 7, and in this form the depth of the front or guide wheels is regulated by a ratchet 8 and pawl lever 9, the lever being joined to the frame by a link 80.

6 designates a yoke shaped draft frame that is pivotally hung on the front cross shaft 40 and at the forward or apex end, the said frame has a king pin 81 to which the draft tongue 82 is connected in such manner that the team and the machine can make short turns.

15 designates a picker and digger roller journaled between the front ends of the side beams 1—1, it having one of its shaft ends 16 extended through one of the sides 1 and provided with a sprocket 17 around which takes an endless chain 18 that imparts motion to the said sprocket in the direction indicated by the arrow $x$, see Fig. 2.

Picker roller 15 has a number of radially projected fingers, the ends of which are curved as at 15$^a$ so that while turning in the direction indicated by the arrow $x$ the said fingers dig down under the potatoes and lift them out of the ground, the curved shape of the fingers causing them to act as scoops for raising the potatoes and delivering them onto an endless conveying apron 5 that elevates the gathered potatoes and discharges them into a trough or box 9 transversely located at the delivery end of the apron 5 and just inside of the rear end 2 of the main frame.

The trough 9 is inclined to cause the gathered potatoes to slide toward the discharge end of the said trough, which end has two outlets 90—91 separated by a longitudinal division 93 and the said discharges terminate in independent tunnel-like members 94 to which the bags for collecting the potatoes are hung. Coöperating with the tunnel-like members 94 is a valve 95 mounted over the entrant ends of the tunnels and in such manner that by moving the crank handle 96 in opposite directions either of the outlets 90 or 91 is held closed while filling a bag or other receptacle from the outer or open outlet.

To provide for a positive feed action of the picker apron onto the off-take trough, the delivery end of the endless apron or conveyer is located close up to the trough 9, see Figs. 1 and 2 and to allow for a free and easy travel of the picker fingers the trough has a series of slots 97 that form a comb-like inner edge for the trough, it being understood one of the slots is provided for each transverse row of picker fingers.

Motion is imparted to the several operating parts of the picking and elevating and delivering mechanism in any approved manner, preferably arranged as shown in Fig. 4, which shows the endless chain 18 as passing over a gear 80 in the front or lower shaft 8 on which are mounted chain wheels 81$^x$ around which the endless chains that form a part of the conveyer pass.

The conveyer comprises the chains 82 to which are connected supplemental link members 83 that project beyond the surface or outer plane of the chain and which form bearings for the journals 84 of the cross slats 85 that carry the conveyer fingers 86 that project therefrom and are curved to take over the potatoes and to form scoop-like members when passing the delivery end of the picker roller, see Fig. 2.

The chain pulleys are provided with belt drivers over which takes the cross belt 89 that receives motion from the rear wheel shaft.

From the foregoing, taken in connection with the drawings the complete construction, the operation and the advantages of my invention will be readily apparent.

Having thus described my invention, what I claim is:

1. A potato digger comprising a frame, having wheeled axles at the front and rear ends, a transversely held trough on the upper end, an endless inclined conveyer belt mounted on the frame with its upper end held to discharge into the trough, a picker roller journaled in the front end of the frame just in advance of and arranged to coöperate with the lower end of the endless conveyer and means driven from one of the wheeled axles for operating the picker and conveyer devices.

2. In a potato digger, the combination with the main frame, an adjustable front extension for the frame, a wheeled axle mounted in the front frame extension, a wheeled axle mounted in the rear portion of the main frame, and a collecting and delivering trough transversely mounted on the frame back of the rear axle; of a picker roller journaled in the forward end of the main frame, an endless conveyer belt journaled on the sides of the main frame, with its upper end held to discharge into the trough, said conveyer and the roller having outwardly projected fingers, the fingers of the conveyer and the drum passing between each other at the lower end of the conveyer, and means for driving the conveyer belt and the picker down.

3. In a potato digger of the character stated, the combination with the main wheeled frame, the picker roller at the front end and the collecting trough at the upper end; of an endless conveyer whose lower end is held to receive the potatoes taken up by the picker and whose upper end discharges into the collecting trough, the said conveyer comprising a pair of oppositely disposed endless chains, chain pulleys therefor mounted in the main frame, said chains including supplemental link members and cross slats whose journals are pivotally mounted in the supplemental chain link members and means operated by one of the drive axles for actuating the picker and conveyer devices.

4. In a potato digger of the character described, the combination with the wheeled frame, the picker roller in the front end thereof and the endless conveyer, said conveyer and the roller having outwardly projected fingers arranged to pass between each other at the discharge side of the roller; of a trough transversely mounted on the upper rear end of the frame, adjacent the discharge end of the conveyer, the side of the conveyer next the said end having slots for the passage therethrough of the conveyer fingers.

FRANK DUMAS.

Witnesses:
MICHAEL T. SCANLON,
WALTER J. MEARS.